United States Patent [19]
Kohaut

[11] 4,088,827
[45] May 9, 1978

[54] INSERT MOUNT AND DEVICE

[75] Inventor: John E. Kohaut, West Orange, N.J.

[73] Assignee: Raceway Components, Inc., Nutley, N.J.

[21] Appl. No.: 542,260

[22] Filed: Jan. 20, 1975

[51] Int. Cl.² ............................................. H02G 3/08
[52] U.S. Cl. ..................................................... 174/48
[58] Field of Search ...................... 174/48, 49, 50, 58; 52/221, 173

[56] References Cited
U.S. PATENT DOCUMENTS

| | | | |
|---|---|---|---|
| 3,597,523 | 8/1971 | Guritz | 174/48 |
| 3,808,760 | 5/1974 | Ward | 174/48 X |
| 3,864,883 | 2/1975 | McMarlin | 174/48 X |

Primary Examiner—J. V. Truhe
Assistant Examiner—D. A. Tone
Attorney, Agent, or Firm—Sommers & Sommers

[57] ABSTRACT

This invention relates to floor inserts for cables and more particularly to a method of and device for applying an electrical insert device and floor covering sheet in overlying relation to an opening station in the floor, for connection of telephone, electrical and other cables to said device.

4 Claims, 5 Drawing Figures

INSERT MOUNT AND DEVICE

BACKGROUND OF THE INVENTION

Heretofore, insert devices were conventionally applied to floors by installing, at stations in the floor initially built into the floor or subsequently formed therein, insert devices, for connection to a junction box for cables and conduits below the floor. In such installations floor covering sheets are frequently used, overlying the entire floor. The invention is particularly related to floor covering sheets made of relatively foldable or flexible materials, such as carpeting, which is increasingly, used as it is generally less expensive to install and maintain and has greater esthetic appeal than other coverings such as tile. There is however a problem in making an opening in carpeting or other floor covering sheets in that, if an opening is made therein for wiring the insert device, it often becomes necessary to use a different location for the insert device and wiring, due to a change in location of desks and other articles. Various expedients have been proposed to solve the problem but they are objectionable as they would leave the old opening in the carpeting exposed or the carpeting otherwise materially damaged at the old station location.

The present invention is directed to a method of and device for overcoming the problems above described, while complying with underwriters' fire ratings. Pursuant to the method of the invention, the floor covering sheet is slitted to define, at the floor covering opening station position in said sheet, a pair of tabs in said covering sheet and forming the insert device with slots in a bottom wall thereof, the tabs and said slots being spaced a distance preferably no greater than that of the opening in the floor for the insert device. The insert device is further preferably provided with an outer insulating surface to prevent heating the tabs so folded into the insert device through said slots. Pursuant to the method of this invention the tabs may be formed by slitting the covering sheet with a slit, preferably of "H" outline, then folding the tabs and inserting them through said slots and close to the insulation wall in said insert device. In said method the floor covering sheet may thereafter if necessary, be restored to essentially monolithic covering relation over the floor station opening, by withdrawing the tabs out of the slots and moving the slots to flat and contiguous position. The tabs can be readily glued or otherwise secured into place to essentially restore the carpet and again, to cover the floor opening with no interruption in the esthetic and physical appearance of original continuity of the covering sheet.

The invention may be used in connection with an opening preformed in the pouring of the concrete or other material of which the floor is formed, or by core drilling into the floor to form said openings, or otherwise formed.

PREFERRED EMBODIMENT OF THE INVENTION

The foregoing and other objects may be achieved, pursuant to the invention, as exemplified below and in the accompanying drawings, wherein.

Figure 1:
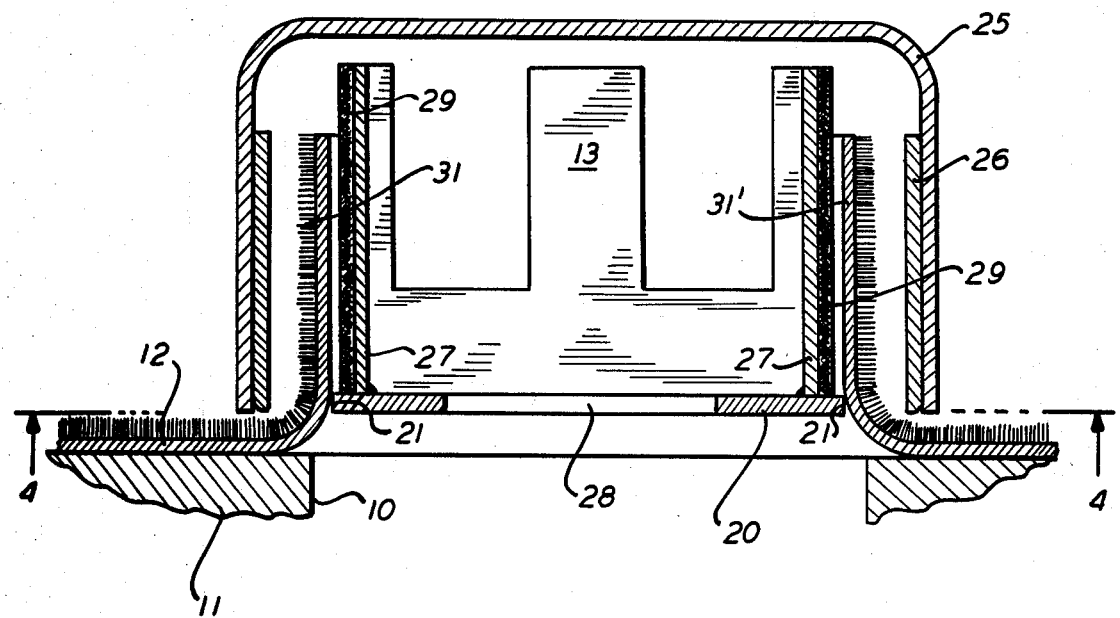
FIG. 1 is a longitudinal sectional view of an insert device and floor covering embodying the invention, the floor covering sheet being shown formed with tabs inserted through slots in the lower wall plate of the insert device.
Figure 2:
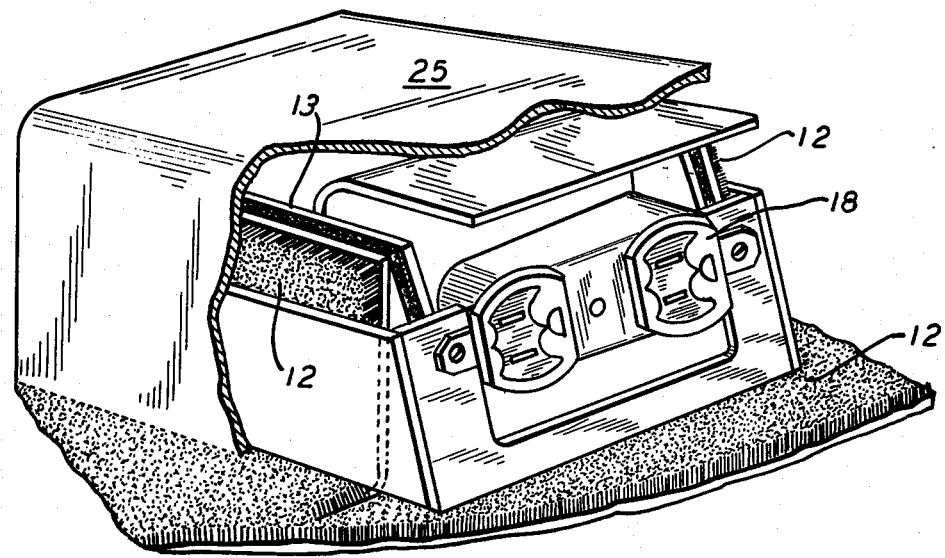
FIG. 2 is a perspective view thereof.
Figure 5:
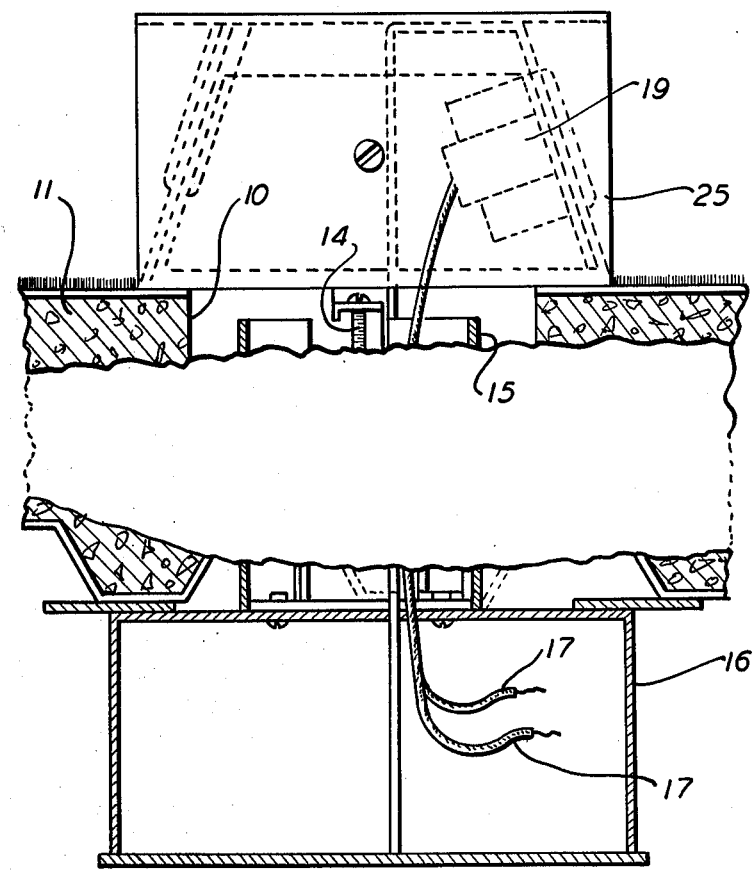
FIG. 5 is a vertical elevational, partly sectional, view of an insert device embodying the invention, shown applied to an opening station in the floor.

As shown in the drawings, the invention may be used in association with opening stations in floors, as, for example, the opening station 10 in floor 11 (FIGS. 1, 5). Said openings 10 may be preformed in the floors by use of suitable equipment to form or mold etc. cement or other floor forming materials and to provide said openings therein at regular or predetermined intervals, (the openings may be core-drilled or otherwise formed after formation of the floor) such as shown at 11, for subsequent application of insert devices to the opening stations. The device is adapted for use in preset, afterset or other forms. Floor coverings 12, such as carpets or other floor covering sheets are applied to the floors so as to cover the same (including the openings 10 therein) providing a desired esthetic, monolithic appearance. As shown in FIG. 5, the upper wire receiving body portion 13 of the insert device may be connected by any desired means, such as bolt and nut means or the like 14 (FIG. 5) to a telescopic or other lower wire receiving body portion 15 which, in turn, may be connected, by suitable means, to a junction box or other source 16 for passage of cables or wires 17 from a suitable power source through the lower section 15 of the insert device and through the upper portion of the insert device. The insert device may be provided with electric outlet units 18 (FIG. 2) to facilitate connection of electrical accessories thereto and may be provided at an opposite or different face thereof with outlets or fixtures for connection of telephone or other equipment thereto. The connections above described may be made through the cables or wires above mentioned and exemplified at 17 in FIG. 5 and may be passed through partitions or otherwise separated in the insert device. The upper body portion is (FIG. 1) provided with a lower wall 20 and opening 28 for passage of the wires 17, etc. and having slots 21 therein for a purpose presently described, and may be covered by a suitable covering plate 25 (FIGS. 1, 2, 5), said slots 21 being spaced apart a distance not greater than that of the opening 10 in the floor 11. The upper body portion 13 is further provided with an outer wall 26 which may be fabricated unitarily with lower wall 20 or secured thereto in a desired or convenient manner, and to which accessories, such as the electrical outlets 18, 19 or the like, may be secured in any desired or convenient manner, and with an inner wall 27 positioned in spaced relation to and preferably parallel to the outer wall 26.

Figure 3:
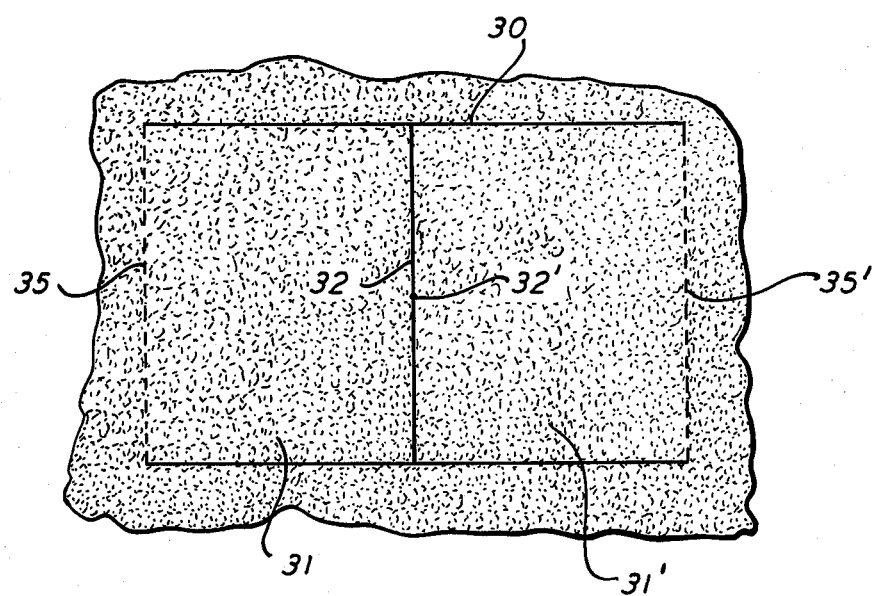
FIG. 3 is a plan view of a portion of the floor covering sheet formed with tabs pursuant to the invention, and showing, in dotted lines, the folding lines for the tabs on inserting them into slots in the bottom wall of the insert device.
Figure 4:
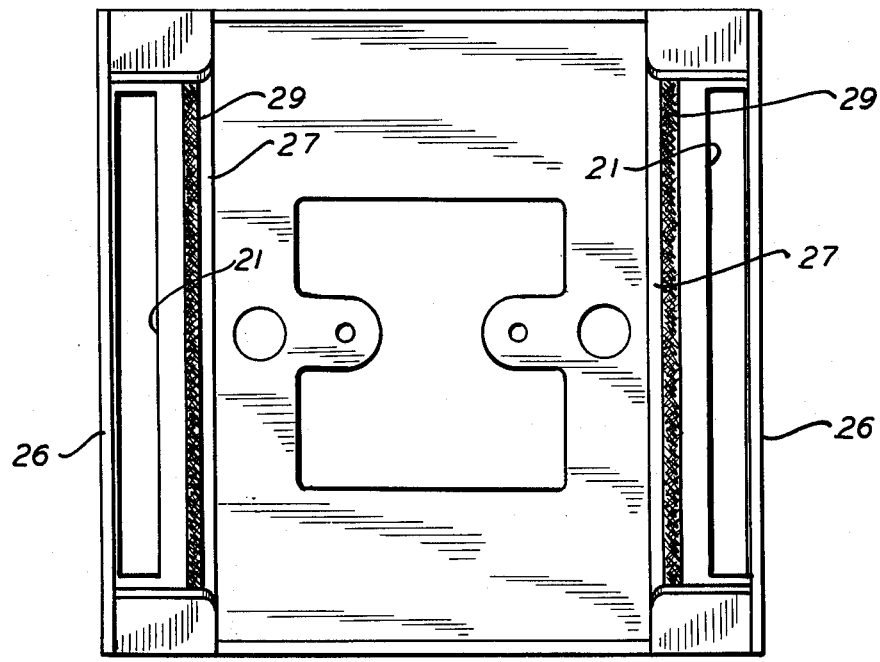
FIG. 4 is a bottom plan view, taken at line 4—4 of FIG. 1.

Pursuant to the method of the invention a thermal insulation wall or covering 29 may be applied to the inner wall 27 to fireproof and insulate the covering sheet tabs 31, 31' from heat passing through the device. Further pursuant to the method of the invention the sheet 12 is provided with slits generally designated at 30 (FIG. 3) to define a tab 31 or tabs 31, 31'. The tab or tabs so formed are proportioned to extend substantially in flat form over the opening station 10 in the floor, being formed in essentially abutting relation as shown at 32'

32, to define essentially U-shaped slits which combined, form the H-slitted portion 30 of the sheet 12 for the purpose above described. The tabs are folded along the outer fold lines indicated by dotted lines 35, 35' and the tabs inserted through the slots 21 in the lower wall 20 of the insert device and moved upwardly in said device and against the inner walls 27 thereof. It will be noted from the foregoing that, by folding the tabs, pursuant to the invention, a clear opening is defined through the floor covering sheet at the floor covering station for wiring the insert device therethrough. When it is desired to remove the insert device and to restore the floor covering sheet to covering relation over the floor opening station, the tabs are withdrawn from the slots and moved to flat, contiguous position, and may be further secured in that position by adhesive or other means.

The insulation walls 29 may be made of thermally expanding materials, such that, in case of fire or elevated temperatures, the walls 29 will foam and expand, sealing the device and defining a barrier against passage of flame or elevated temperatures therethrough. The fire retarding walls 29 may, to that end, preferably be made of material which will automatically expand and foam under pressure on occurrence of fire or highly elevated temperatures. A material we have found highly suitable for that purpose is water glass, which foams and creates tremendous pressures on occurrence of fire or highly elevated temperatures, the foam flowing into all voids, isolating the device in the floor and providing a barrier effectively preventing passage of flame and excess temperatures therethrough. The water glass material described is inorganic hydrated sodium silicate. At about 200° C., the water-vapor escapes, to leave a solid, fine-porous, uncrazed and thermally insulating layer of foamed material, having a density of 0.1 to 0.2 g/m$^3$. It is a compound of sodium, silicon, hydrogen and oxygen.

In lieu of so forming the walls 29, or in addition to so forming them, plates or sheets of such fire retarding materials may be placed elsewhere across or within the upper portion of the insert device.

As above described, by folding the tabs pursuant to the invention, a clear opening is defined through the floor covering sheet at the insert device station, for wiring the insert device uninterruptedly therethrough. Thus the floor covering, such as a carpet, is clear of the raceway so that, in the event of occurrence of a fire, it will not burn. In addition, the upwardly folded tab portions of the carpet are isolated from the raceway by the inner wall 27 of the insert device 13 and by the insulation wall 29 (FIG. 1).

While the present invention has been particularly set forth in terms of specific embodiments thereof, it will be understood in view of the present disclosure, that numerous variations upon the invention are now enabled to those skilled in the art, which variations yet reside within the scope of the present teaching. Accordingly the invention is to be broadly construed and limited only by the scope and spirit of the claims now appended hereto.

I claim:

1. An electrical insert wiring device, positioned, in use, at an opening station in a floor having a flexible covering sheet thereover and said sheet, in use having tab means formed therein overlying said floor opening, said device comprising:
    (a) an axially elongated upper wire receiving body portion,
    (b) a bottom wall and parallel, spaced side walls in said upper wire receiving portion, disposed above said opening station on positioning the insert wiring device thereon,
    (c) a lower wire receiving body portion positioned, in use, in said floor opening,
    (d) means axially adjustably connecting the upper and lower portions of the device and thereby disposing the lower portion in said opening, and below said upper portion and in line therewith, in use,
    (e) slotted tab receiving means in the bottom wall of said upper portion and defining openings through said bottom wall thereof, said openings disposed in spaced relation to each other and spaced from the side walls of said upper wire receiving portion,
    whereby said tab means, in use of the wiring device, are folded and passed through said slotted tab receiving means in the bottom wall of the upper portion and positioned within said upper portion along and parallel to the side walls thereof, clearing said opening for passage of wires therethrough.

2. In an electrical insert device as set forth in claim 1, elongated means disposed interiorly of said upper portion, in spaced relation to and substantially coextensive with the side walls and slotted portions thereof, and forming inner walls defining, with said outer walls, pockets in the upper portion receiving said tab means so positioned in said upper portion.

3. In an electrical insert device as set forth in claim 2, heat insulating means on said inner walls.

4. In an electrical insert device as set forth in claim 2, thermally expanding, flame and heat sealing means on said inner walls.

* * * * *